(12) United States Patent
Koornstra

(10) Patent No.: US 7,818,227 B2
(45) Date of Patent: Oct. 19, 2010

(54) SYSTEM AND METHOD FOR ASSIGNING, TRACKING AND STORING EQUIVALENT EMISSION VALUES OF PURCHASED ITEMS

(75) Inventor: Rudolf Hendrik Theodosius Koornstra, Eefde (NL)

(73) Assignee: Repay International BV, Naarden (NL)

( * ) Notice: Subject to any disclaimer, the term of this patent is extended or adjusted under 35 U.S.C. 154(b) by 947 days.

(21) Appl. No.: 11/213,012

(22) Filed: Aug. 25, 2005

(65) Prior Publication Data

US 2006/0095356 A1     May 4, 2006

(30) Foreign Application Priority Data

Aug. 26, 2004    (EP)   ................... 04077406

(51) Int. Cl.
*G06Q 40/00*     (2006.01)
(52) U.S. Cl. ............... 705/35; 705/1; 705/21; 705/16; 705/23; 705/14.1
(58) Field of Classification Search ............ 705/35, 705/23, 27, 28, 14, 15, 16, 20, 21, 22, 26
See application file for complete search history.

(56) References Cited

U.S. PATENT DOCUMENTS 7,426,489 B2 *   9/2008   van Soestbergen et al. ..... 705/37
2003/0055665 A1    3/2003   Fleming

OTHER PUBLICATIONS

Austin, Duncan and Amanda Sauer. "EarthTrends Featured Topic: Car Companies & Climate Change: Measuring the Carbon Intensity of Sales and Profits." EarthTrends 2003 World Resources Institute. Oct. 2003 (4 pages).*

* cited by examiner

*Primary Examiner*—James P Trammell
*Assistant Examiner*—Elda Milef
(74) *Attorney, Agent, or Firm*—Jacobus C. Rasser

(57) ABSTRACT

Disclosed is a system for assigning, tracking and storing equivalent emission values associated with a transaction. When a transaction takes place the system identifies the purchaser, the vendor, and at least the cost of the transaction. The system contains a database comprising a pre-selected parameter related to an emission value. The system uses this parameter to calculate the emission value of the transaction. The emission value is stored in at least one data-file contained in the system.

8 Claims, 2 Drawing Sheets

SYSTEM AND METHOD FOR ASSIGNING, TRACKING AND STORING EQUIVALENT EMISSION VALUES OF PURCHASED ITEMS

FIELD OF THE INVENTION

The invention relates to a system for assigning, tracking and storing equivalent emission values corresponding to items purchased. The invention also relates to a method for assigning, tracking and storing equivalent emission values corresponding to purchased items.

BACKGROUND OF THE INVENTION

Emission of polluting gas products in the atmosphere has been a concern for several decades. Notably the emission of $CO_2$ has been subject to worldwide conferences such as UNFCC conferences held in Rio de Janairo, Kyoto and Buenos Aires.

In an attempt to reduce the emission of so-called greenhouse gases, i.e. gases that promote the greenhouse effect, such as $CO_2$ and various nitrogen oxides, the European Union has, with the Kyoto protocol, set an objective to reduce the emission amounts of these green houses gases, CO2. and NOx, by 8% compared to the level of 1990. To this end, the European Commission has published a guideline (2003/87/EG) for trade in CO2 rights. According to this guideline all EU countries should have started a system for trading of $CO_2$ rights in 2005. Industries that are intensive users of energy do get an allocation of emission rights at the start. Emission rights can then be traded between companies using emission rights, but as in any other trades, financial institutions like banks and also private persons can enter the trade. Buying emission rights without using them reduces the total available amount and thereby puts pressure on actual reduction of $CO_2$.

Another way to reduce the total amount of greenhouse gases is to invest in new forests, thus binding $CO_2$ in wood.

A private individual, who wants to know how his way of spending money influences the environment, and more in particular the emission of greenhouse gases, has today no system and no method at his disposal to determine the contribution he makes to this emission problem and no system for keeping track of these contributions based on what he buys.

US Patent Application US 2003/0055665 discloses a system and a method for tracking pollution avoided by an employer by adopting a telework scheme for his employees. This, however refers to avoiding pollution by reducing traveling. It does not account for the contribution to pollution by a purchase transaction in both different amounts and different kinds of products.

SUMMARY OF THE DESCRIPTION

It is therefore a goal of the present invention to provide a system and a method for system for assigning, tracking and storing equivalent emission values corresponding to the items purchased, irrespective of the kinds of items or the amounts of items purchased.

A system and method for assigning, tracking and storing equivalent emission values corresponding to purchased items according to the present invention will provide the ability to determine for a variety of types and amounts of purchases of e.g. an individual, or a company to determine the contribution of the total of these purchases, or of a selection thereof, to the emission of greenhouse gases.

It is advantageous if the identifying means comprises card with a magnetic strip, such as the case with most credit cards and bank cards, or a chip card, such as the case with certain credit cards and bank cards, e.g. to identify the purchaser. Use of such cards greatly reduces the errors in transferring data from a purchaser to the system.

It is even more advantageous if the identifying means also comprises a reader for a card or a chip card. This makes the transfer of data less time consuming and more reliable.

In certain countries data on the emission value of product categories is readily available, as e.g. in the RIVM (Governmental Institute for Health and Environment) database in the Netherlands. It is thus quite advantageous if the second data-file of a vendor retains data representing an average or even a weighted average of the emission values of the products sold by the vendor.

The invention will now be described by means of examples of an embodiment of the system and method according to the invention, with reference to the attached drawing, in which.

Figure 1:
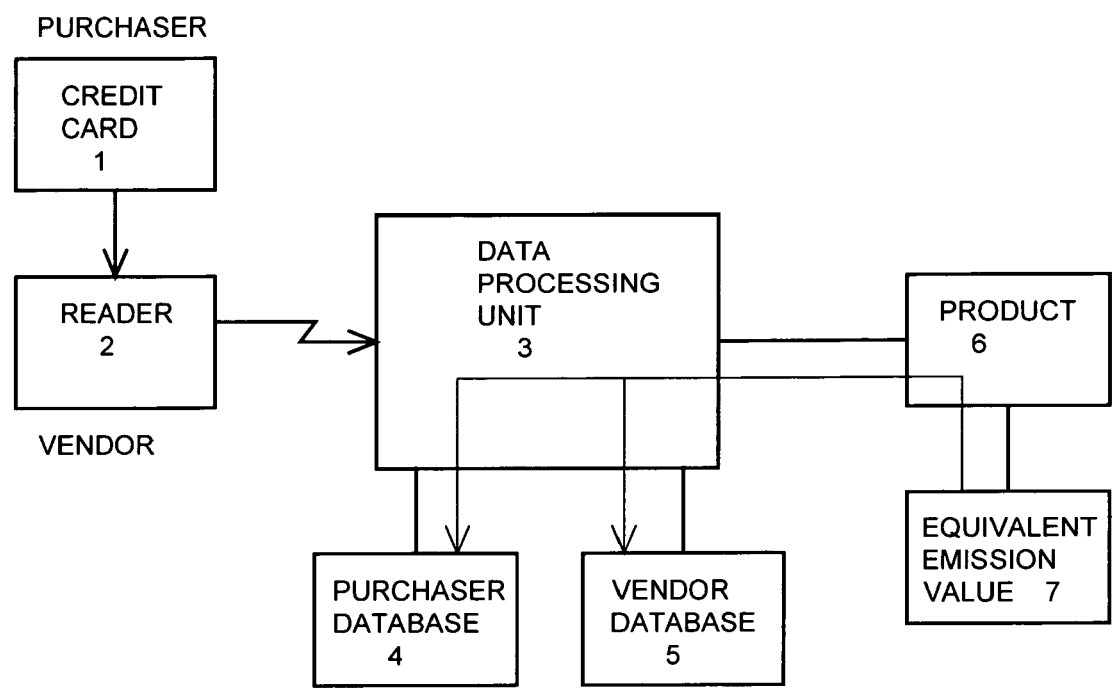
FIG. 1 is a schematic representation of a system according to the invention.

An embodiment of a system according to the invention for assigning, tracking and storing equivalent emission values corresponding to purchased items, is schematically represented in FIG. 1. The system comprises a transaction system with identifying means 1 for identifying a purchaser. The identifying means in this embodiment of the invention is a credit card. The system also comprises an identifying means 2 for identifying a vendor. The identifying means 2 can read data from the credit card 1 and is connected via a telephone line to a data processing unit 3. The telephone line can be a dial up line or a fixed line. The data processing unit has a database connected therewith having stored therein at least a first data-file 4 related to purchasers and a second data-file 5 related to vendors. The data processing unit, which is connected or connectable with the identifying means, is arranged to register a transaction or transactions, pertaining to at least one product, with a cost related to the transaction of the at least one product, between at least one purchaser and at least one vendor. The database contains for each product a code 6 identifying such product and a pre-selected parameter 7 that is related to an emission value assigned to said product, wherein for each registered transaction the data processing unit 3 retrieves the pre-selected parameter 7 representing the emission value assigned to said product 6, calculates the emission value associated with such transaction and stores same in a selection from: the first data-file 4 of the database assigned to the purchaser, the second data-file 5 of the database assigned to the vendor, and the first data-file 4 of the database assigned to the purchaser together with the second data-file 5 of the database assigned to the vendor.

Figure 2:
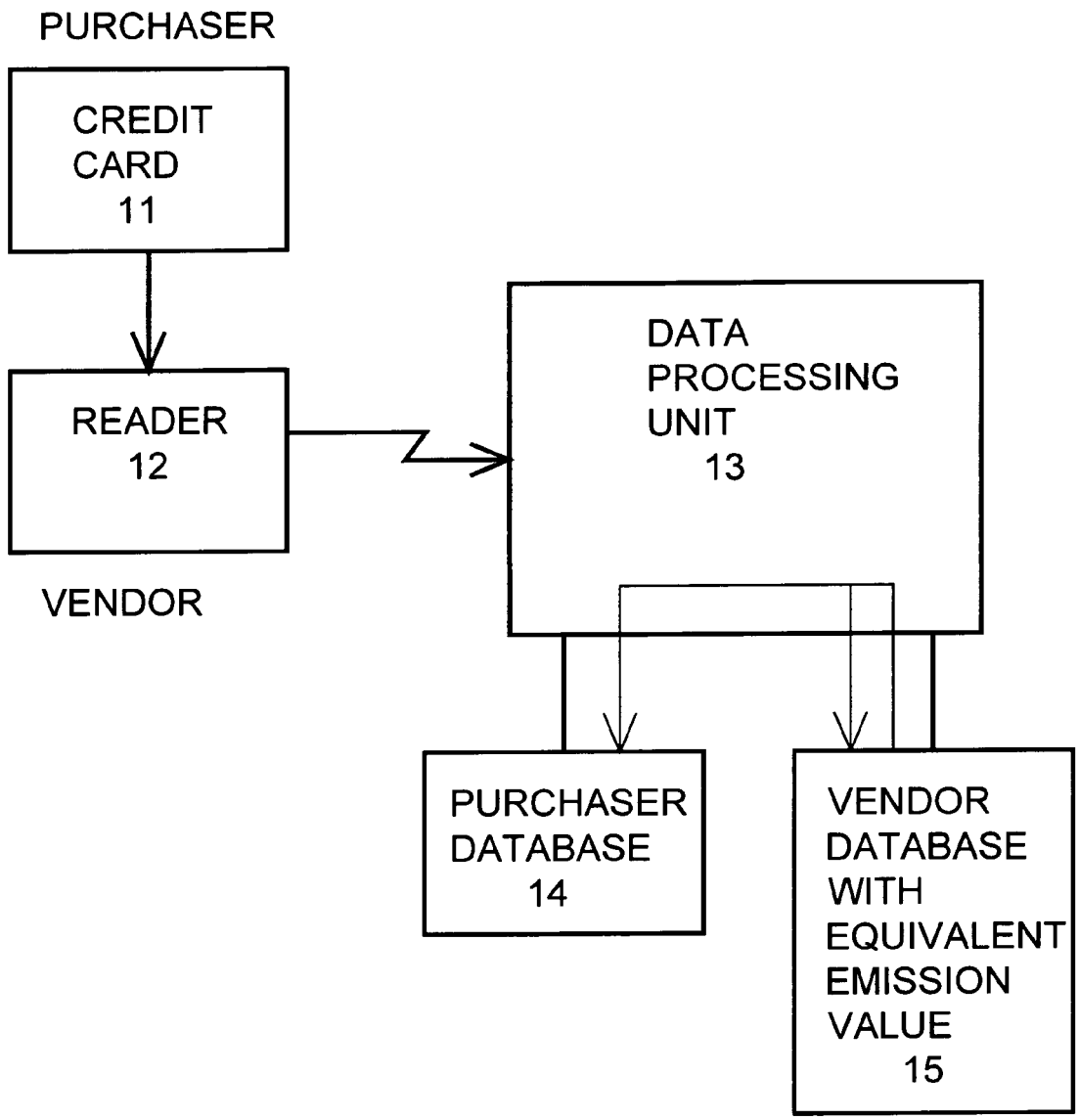
FIG. 2 is a schematic representation of another system according to the invention.

Thus in a preferred embodiment of the invention as shown in FIG. 2, the second data-file 5 comprises a number that represents an average of the emission values of the products sold by the vendor, per unit cost.

Now if a transaction takes place between a purchaser and a vendor, the purchaser puts his credit card 1 in the reader of the identifying means 2 of the vendor, which is a credit card reader, and the credit card reader 2 reads the identification data from the buyer. This data, together with the identification data from the vendor and the cost amount of the transaction is sent via a telephone line to the data processing unit 3. Subsequently the data processing unit retrieves from the second data-file 5, related to the vendor, the number that represents an average of the emission values of the product sold by the vendor, per unit cost. The data processing unit multiplies this number with the cost involved in the transaction. The result of this multiplication is stored by the data processing unit in the first data-file that relates to the purchaser.

Thus, if a transaction is registered by the system between a purchaser and a vendor, the data processing unit can also keep track of the total amount of emission values represented by the purchases made by the purchaser when using this particular credit card.

Such an embodiment of a system according to the invention can be used by a credit card company that issues credit cards and operates such a transaction system, to use a portion of the transaction fee for investment in compensating measures for emission. Such compensating measures may comprise the purchase of emission rights on the open market, and thus reducing the total amount that is available for manufacturers, and thus forcing industry to reduce emissions. Another example of possible compensating measures is in the Joint Implementation and Clean Development Mechanism. These are flexible mechanisms developed under the Kyoto protocol. Yet another possibility can be found in the Renewable Energy Certificatecertificate System. Also a mixture of these measures is possible.

The embodiment and the drawing are for illustration purposes and should not be considered to limit the invention as defined in the attached claims.

The invention claimed is:

1. System for assigning, tracking and storing equivalent emission values corresponding to purchased items, the system comprising a transaction system with:
   identifying means comprising a credit card or a bank card for identifying at least a purchaser and/or a vendor,
   a data processing unit, and a database connected therewith having stored therein at least a first data-file related to a purchaser and a second data-file related to a vendor, said data processing unit connected or connectable with the identifying means, and arranged to register a transaction or transactions, pertaining to at least one product, with a cost related to the transaction of the at least one product, between at least one purchaser and at least one vendor, wherein the database contains for each product a code identifying such product and a pre-selected parameter that is related to an emission value assigned to said product, said data processing unit calculates the emission value associated with such transaction, said calculation comprising a multiplication of the pre-selected parameter and the cost related to the transaction, and stores same in a selection from: the first data-file of the database assigned to the purchaser, a the second data-file of the database assigned to the vendor, and the first data-file of the database assigned to the purchaser together with the second data-file of the database assigned to the vendor.

2. System according to claim 1, wherein the identifying means further comprises a reader for a credit card.

3. System according to claim 1, wherein the second data-file of a vendor retains data representing an average of the emission values of the products sold by the vendor.

4. System according to claim 1, wherein the second data-file of a vendor retains data representing a weighted average of the emission values of the products sold by the vendor.

5. Method for assigning, tracking and storing equivalent emission values corresponding to purchased items comprising the steps of identifying at least a purchaser and/or a vendor, wherein the purchaser identification comprises reading data from a credit card or bank card; registering a transaction or transactions, pertaining to at least one product, with a cost related to the transaction of the at least one product, between at least one purchaser and at least one vendor, and sending the purchaser identification and the cost related to the transaction to a processing unit; wherein by identifying for each product a code and a pre-selected parameter that is related to an emission value assigned to said product, and for each registered transaction retrieving the pre-selected parameter representing the emission value assigned to said product, calculating the emission value associated with such transaction by a data processing unit comprising a multiplication of the pre-selected parameter and the cost related to the transaction, and storing the same in a selection from: a first data-file of a database assigned to the purchaser, a second data-file of a database assigned to the vendor, and the first data-file of the database assigned to the purchaser together with the second data-file of the database assigned to the vendor.

6. Method according to claim 5, wherein the pre-selected parameter represents an average of the emission values of the products sold by the vendors.

7. Method according to claim 5, wherein the pre-selected parameter represents a weighted average of the emission values of the products sold by the vendor.

8. Method according to claim 5, wherein the at least one purchaser and/or one vendor is identified using a reader for a credit card.

* * * * *